United States Patent [19]

Stark

[11] 4,234,878

[45] Nov. 18, 1980

[54] MONITORING DEVICE FOR THE PROPER OPERATION OF LAMPS PARTICULARLY IN MOTOR VEHICLES

[75] Inventor: Wolfgang Stark, Kriftel, Fed. Rep. of Germany

[73] Assignee: VDO Adolf Schindling AG, Frankfurt am Main, Fed. Rep. of Germany

[21] Appl. No.: 918,516

[22] Filed: Jun. 23, 1978

[30] Foreign Application Priority Data

Jun. 23, 1977 [DE] Fed. Rep. of Germany ....... 2728229

[51] Int. Cl.³ .............................................. B60Q 9/00
[52] U.S. Cl. ..................................... 340/642; 315/129
[58] Field of Search ....................... 340/641, 642, 643; 315/129, 86

[56] References Cited

U.S. PATENT DOCUMENTS

| | | | |
|---|---|---|---|
| 3,408,625 | 10/1968 | Skinner | 340/642 |
| 3,514,751 | 5/1970 | Pascente | 340/642 |
| 3,781,841 | 12/1973 | Hughes | 340/642 |
| 3,883,777 | 5/1975 | Morita | 340/641 |

FOREIGN PATENT DOCUMENTS 1515199  6/1978  United Kingdom ..................... 340/642

Primary Examiner—Bernard Konick
Assistant Examiner—Joseph A. Popek
Attorney, Agent, or Firm—Martin A. Farber

[57] ABSTRACT

A monitoring device for the orderly functioning of lamps, particularly in motor vehicles, with a circuit control element arranged in the circuit of the lamps, on which control element a control signal occurs during switching-on of the lamps, as well as with circuit components in a signal circuit, the latter being applied with the control signal. In the circuit of each lamp there is arranged a low impedance resistor, and the low impedance resistor is connected with an input of an amplifier circuit arrangement. An indicator device is connected to the output of the amplifier.

12 Claims, 1 Drawing Figure

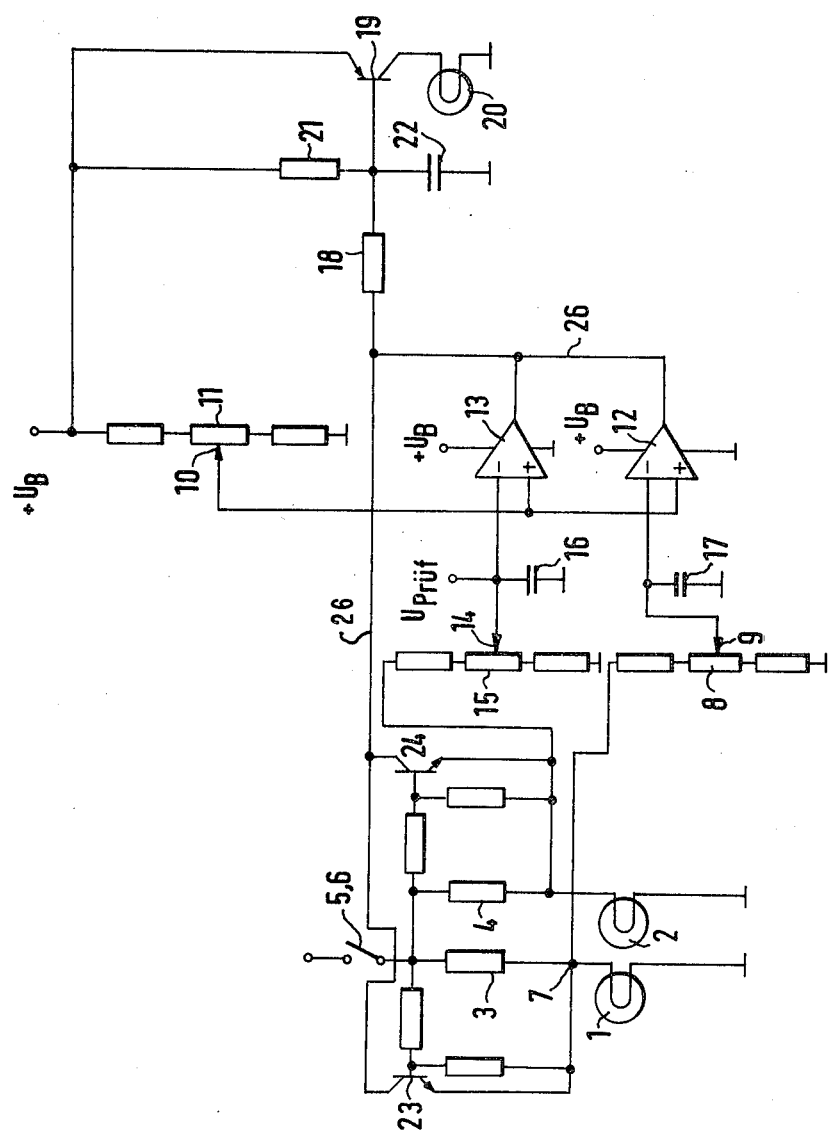

MONITORING DEVICE FOR THE PROPER OPERATION OF LAMPS PARTICULARLY IN MOTOR VEHICLES

FIELD OF THE INVENTION

The invention relates to a monitoring device for the orderly proper operation of lamps, particularly in motor vehicles, with a circuit control element arranged in the circuit of the lamps, on which control element there occurs a control signal during turning-on of the lamps, as well as with circuit components in a signal circuit, the circuit components being applied with the control signal.

BACKGROUND OF THE INVENTION AND PRIOR ART

With a known monitoring device of such a type, in each circuit of two lamps to be switched-on in pairs there is arranged an excitation coil. Both excitation coils are disposed in a magnetic circuit, in the influence range of the latter there being arranged a magnetically actuated switch, namely a reed contact. The reed contact is operatively connected in a signal circuit, in which an indicator lamp serves as a signal transmitter. If both lamps which are to be monitored are simultaneously turned-on and are intact, the magnetic fluxes which are created by the currents in the excitation coils are neutralized or cancelled, and the magnetically influenceable reed contact remains open, so that the indicator lamp does not light up. To the contrary, if one of the two lamps are defective, then the magnetic flux which is produced by the excitation coil which is coordinated thereto is not compensated, and the magnetically influenceable reed contact is closed. In this case the indicator lamp is illuminated.

With this known monitoring device it is disadvantageous that the magnetically influenceable contact is comparatively expensive when it should be suited for a reliable operation over a long period of time. The assembling of this contact in the magnetic circuit with the excitation coils moreover has technical manufacturing disadvantages. The excitation coils must produce a magnetic induction that is sufficient for actuation of the contact; consequently they must have a sufficient winding number or number of turns. Thereby voltage drops can occur which are disturbing in the circuit of the lamps if the cross-section of the wire of the excitation coils is not selected sufficiently large, which can yet again increase the manufacturing costs. With the arrangement of the magnetically actuatable contact in the magnetic circuit, attention is carefully to be paid that the magnetic fluxes cancel and compensate, respectively, with intact circuits of the lamps. This also assumes lamp circuits which are to be switched-on in pairs with the same electrical values. In this manner the use of the known monitoring device can be limited.

The present invention thus is based on the task to provide a monitoring device avoiding the previously-mentioned disadvantages, which is suited for the monitoring of any arbitrary number of lamps to be simultaneously turned or switched-on, thus also being suited merely to one single lamp, which requires a comparatively small manufacturing expense with a reliable manner of operation, and particularly does not require an electromechanical actuatable contact as a circuit control element. Also the voltage drops caused by the monitoring device in the circuits of the lamps should be as low as possible.

SUMMARY OF INVENTION

It is another object of the present invention, starting out from a monitoring device of the introductory-mentioned type, to aid the solution of the above-mentioned object in the manner that in the circuit of each lamp (e.g., 1 and 2, respectively) there is arranged a low impedance resistor (e.g., 3 and 4, respectively), and the low impedance resistor is connected with an input of an amplifier circuit arrangement (e.g., differential amplifier 12, 13), on the output of which amplifier there is connected an indicator device (e.g., indicator lamp 20).

This monitoring device has the important or essential advantage that the monitoring of each lamp occurs independently of one or several additional lamps to be switched-on or connected. In order to hold the voltage drop in the circuit of the lamps low, starting out from the concept of solution, for measurement of the voltage drop, a low impedance resistor is to be connected or switched into the circuit of the lamps and the voltage difference or voltage occurring with a defective lamp is to be amplified such that it suffices for actuation of the signal circuit. With the use of integrated operational amplifiers this circuit arrangement thus is relatively less expensive with the monitoring of a plurality of lamps. Each signal circuit, which includes an amplifier, can be equalized or balanced individually in a simple manner in order to trigger the indicator device only with one defective lamp. This equalization consequently can take place in a simple manner since it is not influenced by the parameters of a second circuit of the lamps.

In a particularly advantageous manner, the monitoring device is constructed with the features that each circuit of one lamp each (e.g., 1 and 2, respectively) is arranged in a bridge circuit, the first branch of which is formed by the low impedance resistor (3 and 4, respectively), the second branch of which has a lamp (1 and 2, respectively), the third and fourth branches of which are formed by a potentiometer (11), and that as an amplifier circuit arrangement, a differential amplifier (12 and 13, respectively) is used, the inputs of which are connected to the bridge diagonal between the first and second branches as well as between the third and fourth branch. This monitoring device is balanced or equalized such that the diagonal voltage of the bridge assumes or takes on a first value when the lamp is intact, upon which the output voltage of the differential amplifier takes on a first magnitude, and that the diagonal voltage of the bridge attains a second defined value when the lamp is defective, in order to bring the output voltage of the differential amplifier to a value sufficient for actuation of the signal circuit.

In an advantageous manner the monitoring device is further sized such that that the low impedance resistor (3, 4) in the circuit of the lamp (1, 2) has a value of resistance under 0.2 ohms. This resistance value in connection with lamps of small output of for example five watts, suffices in order after amplification to trigger the signal circuit in the case of a defective lamp.

With lamps of relatively large power consumption over 20 watts, such type of a sizing of the monitoring device is recommendable where the low impedance resistor (3, 4) has an amount or value of resistance under 50 milliohms.

In a particularly advantageous manner the monitoring device is constructed such that the low impedance resistor (3, 4) is formed by a conductor track of a laminated or sheet-lined printed circuit board. In this manner the low impedance resistor not only permits particularly economical and efficient production of the low impedance resistor not only in connection with the remaining circuit components, but rather also avoids contacting problems which can falsify the signal being applied to the signal circuit.

An advantageous further formation of the monitoring device is characterized in the manner that for the monitoring of the low impedance resistor (3, 4), its voltage drop is tapped and likewise is applied to the signal circuit (18 to 22) via at least one transmission element (transistor 23 and 24, respectively). In an advantageous manner the transmission element can thereby comprise an amplifier stage. By this further formation the following is avoided: a circuit of the lamps fails because of destruction of the low impedance resistor and the failure of the circuit of the lamps is not indicated.

Moreover the monitoring device advantageously can be constructed such that the outputs of the amplifiers (12, 13) and under circumstances of the transmission elements (transistors 23, 24) are linked with one another in an OR circuit arrangement, the output of the OR circuit arrangement standing in connection with an indicator lamp (20) via a power amplifier stage (19). Thus for monitoring of all lamps and for monitoring for all low impedance resistors in the current circuits of the lamps, only one power amplifier with one indicator lamp is needed.

Advantageously the monitoring device moreover has the features that as a transmission element, there is provided each one amplifier (transistor 23 and 24, respectively) and that the amplifiers which monitor the resistors (3, 4) and the amplifiers which monitor the lamps (1, 2) have open collector outputs, and with use of the open collector outputs, are linked with one another in an OR circuit arrangement. Thereby thus the amplifiers are drawn upon for use for the production of the OR circuit arrangement. Since the OR-linking is provided on the outputs of the amplifiers, the dimensioning or sizing of the circuit is not critical.

BRIEF DESCRIPTION OF DRAWINGS

With the above and other objects in view, the present invention will be more clearly described in connection with a preferred embodiment of the invention in connection with the accompanying drawing, of which the only FIGURE is a circuit diagram of the monitoring device of the invention.

DETAILED SPECIFICATION

Two incandescent or filament lamps 1 and 2 of the lights of a vehicle are illustrated. In the circuit of each incandescent lamp there is disposed a low impedance resistor 3, 4 and a switch 5, 6. From the common connection point 7 of the incandescent lamp 1 and of the low impedance resistor 3, a line leads to a voltage divider with a potentiometer 8. The slider 9 of the potentiometer 8 forms one point of a bridge circuit arrangement. The second point of the bridge circuit arrangement is formed by a slider 10 of the potentiometer 11, which constitutes a part of the voltage divider of the circuit or service voltage. The sliders 9 and 10 are connected to two inputs of a differential amplifier 12.

In an analogous manner the inputs of a second differential amplifier 13 stand in connection with a slider 14 of a potentiometer 15 on the common connection point of the low impedance resistor 4 and of the incandescent lamp 2, moreover as well as standing in connection with the slider 10 of the potentiometer 11. Moreover on one input of the differential amplifier 13 there can further be connected an examination or checking voltage source.

The inputs of the differential amplifiers, which inputs lead to the circuit of the lamps, are grounded via each a capacitor 16 and 17, respectively, in order to eliminate the influence of switch-on impulses, which influence would be disturbing under circumstances.

The open collector outputs of the differential amplifiers 12 and 13 are linked or joined with one another in an OR circuit arrangement, which stands in connection with the base of a power amplifier 19 via a resistor 18. An indicator or signal lamp 20 is arranged in the load circuit of the power amplifier 19. The base circuit of the power amplifier moreover has a resistor 21 for adjustment of the biasing prevoltage and a capacitor 22 for the suppression of the interfering or disturbance impulse.

For monitoring of each of the low impedance resistors 3, 4 in the lamp circuits, there serves each one further transistor 23, 24. The collectors of these transistors are connected to the output line 26 of the amplifiers 12, 13, in order to be linked with the OR circuit arrangement. A voltage which corresponds to the voltage drop on the low impedance resistors 3, 4 lies at the base of each transistor 23, 24, respectively.

If both incandescent lamps 1 and 2 are intact, a voltage drop occurs on the low impedance resistors 3 and 4, so that the potentials at the sliders 9 and 14 are relatively low with respect to the service voltage. The differential amplifiers 12, 13 consequently deliver a signal in the OR circuit arrangement that indicates the orderly proper functioning of the incandescent lamps 1 and 2. Corresponding to the current occurring at the output of the OR circuit arrangement on the resistor 18, the power amplifier 19 remains locked, so that the indicator lamp 20 is not illuminated.

However if for example the incandescent lamp 1 is consumed or destroyed, consequently a relatively high voltage exists at the connection point 7, which by means of the differential amplifier 12 sends a signal to the power amplifier 19, which signal represents the defective operating condition. In this case the power amplifier 19 is in the conducting condition, so that the indicator lamp 20 lights up.

In an analogous manner, the transistors 23 and 24 emit signals to the OR circuit arrangement, which signals normally mean the intact condition of the low impedance resistors 3, 4. However if, for example, a resistor 3 is disconnected or interrupted, the base-emitter voltage of the transistor 23 increases so that the transistor 23 sends a signal, signalizing the defective operating condition, via the OR circuit arrangement, to the power amplifier 19, so that also in this case the indicator lamp 20 signals a disturbance.

I claim:

1. A lamp burnout indicating circuit, particularly for monitoring at least one lamp constituting a first-mentioned lamp in motor vehicles, with a signal circuit, said at least one lamp being energizable from a circuit voltage, comprising a resistor connected in series with the lamp operatively to said circuit voltage, said resistor having a small resistance in comparison with the resistance of said lamp, said signal circuit including an indicator lamp, at least one differential amplifier means for sensing a voltage at a point between said resistor and said first-mentioned lamp and providing an output signal for said indicator lamp for actuating the latter when a defective condition of said first-mentioned lamp occurs, a potentiometer means connected in series between said point and said differential amplifier means for adjusting said differential amplifier means according to characteristics of said first-mentioned lamp, and transmission means for operatively applying a voltage drop across said resistor to said signal circuit for signalling a defective condition of said resistor.

2. The monitoring circuit according claim 1, including, at least one bridge circuit, said at least one lamp is arranged in said at least one bridge circuit, said at least one bridge circuit has a first branch, a second branch and a third and fourth branch, said at least one bridge circuit defines a bridge diagonal between said first and second branches as well as between said third and fourth branch, said first branch is formed by said resistor constituting a low impedance resistor, said second branch includes said first-mentioned lamp, a voltage divider of said circuit voltage forms said third and fourth branch, respective inputs of said differential amplifier means are connected to said bridge diagonal of said at least one bridge circuit between said first and second branches as well as between said third and fourth branch.

3. The monitoring circuit according to claim 2, further comprising a plurality of lamp circuits each including one said first-mentioned lamp in series with one said resistor, respectively, a plurality of said differential amplifier means each operatively sensing the voltage at said point of a corresponding one of said resistors, the respective outputs of said plurality of said differential amplifier means are linked with one another in an OR circuit arrangement, the signal circuit includes a power amplifier stage connected to the output of said OR circuit arrangement, said indicator lamp is connected to said power amplifier stage.

4. The monitoring circuit as set forth in claim 3, wherein said voltage divider comprises a potentiometer connected in common to one of said inputs of each of said plurality of said differential amplifier means.

5. The monitoring circuit according to claim 2, including means for monitoring said low impedance resistor comprising, means for tapping the voltage drop of said low impedance resistor including said transmission means for operatively applying said voltage drop to said signal circuit, a plurality of lamp circuits each containing one said first-mentioned lamp to be monitored and one said resistor in series therewith, a plurality of said differential amplifier means each operatively sensing the voltage at said point of a corresponding one of said resistors, the respective outputs of said differential amplifier means and of said transmission means are linked with one another in an OR circuit arrangement, the signal circuit includes a power amplifier stage connected to the output of said OR circuit arrangement, said indicator lamp is connected to said power amplifier stage.

6. The monitoring circuit according to claim 1, wherein said resistor has a resistance value of under 0.2 ohms.

7. The monitoring circuit according to claim 1, wherein said resistor has a resistance value of under 50 milliohms.

8. The monitoring circuit according to claim 1, wherein said resistor is formed by a conductor track of a laminated printed circuit board.

9. The monitoring circuits according to claim 1, including means for monitoring said resistor comprising, means for tapping the voltage drop of said resistor including said transmission means for operatively applying said voltage drop to said signal circuit.

10. The monitoring circuit according to claim 9, wherein said transmission means comprises at least one transistor connected across said resistor.

11. The monitoring circuit according to claim 9, wherein said transmission means comprises an amplifier adapted for monitoring said resistor, said differential amplifier means is adapted for monitoring said first-mentioned lamp, said amplifier and said differential amplifier means have collector outputs, said collector outputs are linked with one another in an OR circuit arrangement.

12. The monitoring circuit according to claim 1, further comprising said differential amplifier means has inputs, said potentiometer means is connected to one of said inputs of said differential amplifier means, another potentiometer means for dividing said circuit voltage is connected to another of said inputs of said differential amplifier means, a power amplifier is operatively connected to the output of said differential amplifier means and to said indicator lamp, a transmission amplifier is operatively connected across said resistor and to said output of said differential amplifier means forming an OR circuit therewith.

* * * * *